United States Patent [19]

Pankratz

[11] Patent Number: 4,888,381

[45] Date of Patent: Dec. 19, 1989

[54] ADHERABLE POLYESTER FILM

[75] Inventor: Richard P. Pankratz, Circleville, Ohio

[73] Assignee: E. I. Du Pont de Nemours and Company, Wilmington, Del.

[21] Appl. No.: 206,431

[22] Filed: Jun. 14, 1988

[51] Int. Cl.$^4$ .............................................. C08L 67/02
[52] U.S. Cl. .................................. 524/751; 427/388.2; 427/388.4; 428/480; 428/482; 525/443; 525/448; 528/305; 528/486; 528/502; 524/113; 524/752
[58] Field of Search ................. 525/444, 448; 524/601, 524/602, 751, 802, 845, 752, 113; 428/482, 480; 427/302, 412.5, 388.2, 388.4; 528/305, 502, 486

[56] References Cited

U.S. PATENT DOCUMENTS

| | | | |
|---|---|---|---|
| 3,212,920 | 10/1965 | Chapman | 528/305 |
| 3,434,916 | 3/1969 | Braunisch et al. | 428/480 |
| 3,484,339 | 12/1969 | Caldwell | 428/480 |
| 3,678,128 | 7/1972 | Reimhofer et al. | 525/443 |
| 4,054,614 | 10/1977 | Hoffman | 260/850 |
| 4,088,619 | 5/1978 | Holzrichter | 260/29.4 R |
| 4,140,819 | 2/1979 | Tobias et al. | 427/178 |
| 4,232,090 | 11/1980 | Simon | 525/443 |
| 4,238,583 | 12/1980 | Tobias | 525/443 |
| 4,476,189 | 10/1984 | Posey et al. | 428/336 |
| 4,752,532 | 6/1988 | Starka | 428/480 |

FOREIGN PATENT DOCUMENTS 58-29626 2/1983 Japan .
1589926 5/1981 United Kingdom .

Primary Examiner—Veronica P. Hoke

[57] ABSTRACT

A crystalline polyester film or sheet coated with a priming composition consisting essentially of a carboxyl group-containing copolyester, wherein the carboxyl groups are introduced either by treatment of the terminal hydroxyl groups of the copolyester with a dicarboxylic acid anhydride or by pyrolysis of the copolyester. Such primer compositions form continuous wet films and dry coatings and provide surfaces receptive to a variety of surface finishes such as further polymer coatings and inks. Further, the primer-coated polyester can be recycled and can be used in applications where the coating is in contact with food articles.

23 Claims, No Drawings

ADHERABLE POLYESTER FILM

BACKGROUND OF THE INVENTION

This invention relates to an adherable film or sheet of a crystalline polyester coated on at least one side thereof with a carboxylated polyester primer composition having good adherability both to the base polyester and to other coating compositions such as, for example, solutions or dispersions of inks or pigments, polymer latices, dispersions of magnetic or photographic materials, and evaporatively deposited metal. These carboxylated copolyester primer compositions may also be used to impart to the crystalline polyester substrate heat sealability to itself and to other materials.

Further, this invention relates to film-forming carboxylated polyester emulsions useful in preparing primer coatings for such applications.

Polyester films or sheets, especially those of polyethylene terephthalate (PET), are widely used in such applications as packaging, decorative articles, magnetic recording media, and photographic film. In such applications, the polyester film is printed or coated with a variety of materials, which must be applied as a uniform and continuous layer and must well adhere to the base polymer. However, PET and similar polymers do not have good receptivity to most surface-treating compositions. This problem has long been recognized in the prior art, and various methods have been developed to increase the polyester film's surface receptivity. A good discussion of the prior art in this area can be found in U.S. Pat. No. 4,467,189 (Posey et al., American Hoechst Corp.) granted Oct. 9, 1984. Nevertheless, most primers used commercially are oriented to specific end uses and are suitable only for either hydrophobic or hydrophilic surface treatment. Further, most such primer compositions interfere with recycling of the polyester scrap.

U.S. Pat. No. 4,476,189 discloses a primed water-dispersible copolyester of terephthalic acid, an aliphatic dicarboxylic acid, and an aromatic sulfonated monomer with an alkylene glycol. The resultant primed polyester film is said to provide excellent adhesion to many subsequently applied aqueous or solvent-based coatings.

The presence of the aromatic sulfonated monomer, which can be sodium sulfoterephthalic acid or a similar sulfonated derivative of a phthalic acid, is a shortcoming because such starting materials are not widely commercially available and therefore are expensive; and also, PET film coated with such a primer composition would not be readily recyclable for use in contact with food because the sulfonated monomer is not FDA-approved.

It is thus desirable to provide a primed polyester film or sheet which could be manufactured from inexpensive, readily available materials, and which could be recycled for a variety of uses, thus providing an additional manufacturing advantage.

BRIEF SUMMARY OF THE INVENTION

According to this invention, there is provided a crystalline polyester film or sheet coated with a carboxyl group-containing copolyester primer composition consisting essentially of a copolymer of a mixture of dicarboxylic acids, the total amount of the acid components being 50 mole percent, with at least one diol, the total amount of diol component being 50 mole percent, the copolymer being further modified by esterifying the terminal hydroxyl groups by treatment with an anhydride of a dicarboxylic acid, or by pyrolysis of the copolyester, thus providing terminal carboxyl groups; said carboxylated copolyester composition further being optionally crosslinked by means of a melamine-formaldehyde, urea-formaldehyde, benzoguanamine-formaldehyde, glycoluril-formaldehyde, epoxy, or aziridine resin.

There is also provided an aqueous emulsion of said carboxylated copolyester primer composition.

DETAILED DESCRIPTION OF THE INVENTION

The preferred crystalline polyester film or sheet is PET, which is commercially available from several sources. Other linear, crystalline polyester films, including for example ethylene glycol polyesters of isophthalic acid or of mixtures of terephthalic and isophthalic acids, or polyesters of other glycols, especially of butanediol or mixtures of ethylene glycol with butanediol, can also serve as the base polyester film or sheet. For the purpose of this invention, the term "film or sheet" also includes tapes, disks, and similar commercial articles.

A preferred starting material used in the copolyester primer composition is a polymer of about 0–40 mole % of isophthalic acid, 0–30 mole % of terephthalic acid, 0–40 mole % of azelaic acid, and 0–40 mole % of adipic acid, the total amount of the acid component being 50 mole %; and 0–50 mole % of ethylene glycol, 0–40 mole % of neopentyl glycol, and 0–20 mole % of diethylene glycol, the total amount of the diol component being 50 mole %. Particularly preferred compositions are:

| | |
|---|---|
| A. | 22.5 mole % terephthalic acid |
| | 17.5 mole % isophthalic acid |
| | 10 mole % azelaic acid |
| | 33 mole % neopentyl glycol |
| | 17 mole % ethylene glycol |
| B. | 20 mole % terephthalic acid |
| | 20 mole % isophthalic acid |
| | 5 mole % adipic acid |
| | 5 mole % azelaic acid |
| | 50 mole % ethylene glycol |
| C. | 16.5 mole % terephthalic acid |
| | 8.5 mole % isophthalic acid |
| | 25 mole % azelaic acid |
| | 50 mole % ethylene glycol |
| D. | 25 mole % terephthalic acid |
| | 10 mole % isophthalic acid |
| | 15 mole % azelaic acid |
| | 50 mole % ethylene glycol |
| E. | 25 mole % isophthalic acid |
| | 25 mole % azelaic acid |
| | 50 mole % ethylene glycol |

The copolyesters have weight average molecular weights ranging from about 20,000 to 60,000 and number average molecular weights from about 10,000 to 30,000.

Other representative dicarboxylic acids that can be used as the starting materials for the preparation of copolyesters useful in the primer compositions of the present invention include succinic, malonic, meleic, fumaric, 1,5-pentanedioic, suberic, sebacic, 1,12-dodecanedioic, itaconic, and phthalic acids.

Typical representative diols suitable in the preparation of copolyesters useful in the primer compositions of the present invention include ethylene glycol, 1,3-propanediol, 1,4-butanediol, diethylene glycol, 1,5-pentanediol, 1,6-hexanediol, neopentyl glycol, 1,4- cyclohexanedimethanol, 1,4-cyclohexanediol, and polyglycols obtained by a reaction of a diol with ethylene oxide. Ethylene glycol is the preferred diol.

The copolyesters useful in the primer compositions of the present invention may have a lactone copolymerized therewith, e.g., caprolactone.

The anhydride used to modify the starting copolyester can be derived from virtually any dicarboxylic acid, including aliphatic, aromatic, cycloaliphatic, saturated, and unsaturated acids. Typical representative anhydrides include for example, adipic, succinic, glutaric, sebacic, maleic, and phthalic anhydrides. The preferred anhydrides for this purpose are glutaric, phthalic and succinic anhydrides. One way this esterification can be carried out is by heating the hydroxyl-terminated copolyester, with the anhydride in the absence of a solvent at a temperature of about 200° C. Another way the esterification can be carried out is by contacting the hydroxyl-terminated resin with the anhydride in a solvent using a tertiary amine as a catalyst. The anhydride normally is used in excess of the stoichiometric amount, and the excess is removed by hydrolysis.

Another way of preparing carboxylic acid-terminated copolyester is to pyrolyze the copolyester by holding the copolyester at an elevated temperature of about 150° C. until the desired acid number is obtained.

The melamine-formaldehyde, urea-formaldehyde, benzoguanamine-formaldehyde, glycoluril-formaldehyde, epoxy, and aziridine resins used as crosslinking agents are articles of commerce. Various such resins can be obtained, for example, from American Cyanamid Co. under the trademarks Cymel ® and Beetle ®, from Virginia Chemicals under the trademark Xama ®, and from Shell Chemical Co under the trademark Epon ®. The resin is used in an amount of 0 to 40%, based on the weight of the carboxylated copolyester, and is preferably added to the coating composition, which is in the form of an aqueous emulsion. The aqueous emulsion is prepared by dissolving the carboxylated copolyester in tetrahydrofuran, neutralizing the carboxylic groups with an inorganic base, ammonia, or an organic amine, adding water with good agitation to cause emulsification, and evaporating tetrahydrofuran, preferably at a reduced pressure. Surface active agents in general do not favorably affect emulsification. In particular, anionic surfactants adversely affect emulsion quality.

While one of the solvents used for emulsification must be tetrahydrofuran, other water-soluble solvents such as, for example, dioxane, acetone, dimethoxyethane, methyl ethyl ketone, and methanol can be present in varying concentrations without adversely affecting emulsion quality. The amount of cosolvent depends on the cosolvent used and can range from 25 to 75% by weight of the total tetrahydrofuran-cosolvent mixture. A 75:25% by weight mixture of methyl ethyl ketone and tetrahydrofuran provides an especially preferred emulsification solvent mixture for use in this invention.

Suitable bases for neutralizing the carboxylic acid end groups should form water-soluble salts with carboxylic acids. Preferred are tertiary aliphatic amines which are liquid at room temperature, such as triethylamine, tripropylamine, tributylamine, etc. Tertiary amines are preferred because of better hydrolytic stability relative to ammonia and to primary and secondary amines, coupled with their ready volatility so that they do not impede the crosslinking reactions. Of course, it is preferred to use the lowest practical molecular weight amine because of its lower cost per mole and better water solubility.

In the practical operation of this invention, a polyester film, such as polyethylene terephthalate or another linear polyester, either unstretched or uniaxially or biaxially stretched, is coated with an aqueous emulsion of the carboxylic acid-terminated copolyester by any conventional technique, such as, for example, passing the polyester film through a bath of the coating emulsion or by applying the emulsion to one side only with a roller or a brush. The coated material is then dried, the coated film stretched, if desired, and heated to a sufficient temperature to cause crosslinking of the polymeric coating with the crosslinking agent. If the coating is applied to an unstretched film, or unidirectionally stretched film, the film can be stretched following the coating step without loss of the mechanical integrity of the coating and then heated to a sufficient temperature to cause crosslinking. For best results, the thickness of the primer coating after drying and stretching should be about 0.01 to 0.10 μm, preferably 0.03 to 0.06 μm. The usual amount of coating material is about 0.03 to 0.06 g/m² of polyester film surface.

For best results, the thickness of the heat-sealable coating is 0.05 to 15 μm, preferably 1–3 μm. The usual amount of coating material is about 1 to 3 g/m² of polyester film surface.

It has been surprisingly found that the starting copolyesters, even though they can be well emulsified and form continuous wet films with wetting aids, do not themselves form continuous dry coatings. Thus, formation of free carboxylic acid end groups is a necessary step in this invention. The quality of the primer coating is to some extent related to the acid number of the carboxylated copolyester (thus, its molecular weight). It has been found that copolymers with an acid number as low as 3 can be emulsified satisfactorily according to the present invention and give good continuous dry coating on the polyester substrate. However, generally, a carboxylated copolyester with a higher acid number will be preferred, e.g., 4–12. Too high an acid number, for example, above 20, is undesirable because such a copolymer has a low molecular weight, which leads either to a highly crosslinked coating or to one having low integrity.

The amount of crosslinking resin used in the compositions of this invention, while normally sufficient to crosslink all the free carboxyl groups of the polymer, can be adjusted to crosslink only some of the carboxyl groups, leaving a portion of the carboxyl groups uncrosslinked. Such partially crosslinked polymer would have greater receptivity for certain hydrophilic coatings, such as, e.g., photographic emulsions.

Wetting aids or surfactants, while usually detrimental when added during the emulsification, often are found to be beneficial when added to a formed emulsion and are frequently required for practical use of this invention. While polymeric emulsions made as described above are film-forming, these emulsions often do not wet polyester films due to the emulsions' higher surface tension. As is well known, addition of surfactants to the liquid phase to lower its surface tension to less than that of the substrate permits formation of a continuous wet film.

Most commercial surfactants which result in a surface tension (energy) of less than that of polyester film may be used.

Particularly preferred surfactants are sodium lauryl sulfate, sodium salt of dioctyl sulfosuccinate, nonylphenol polyethylene glycol ethers, and ammonium lauryl ether sulfates.

An unexpected additional advantage of the copolyester coating compositions and of the copolyester coated polyester films of the present invention is that coated scrap material can be recycled, so that waste can be substantially eliminated. This recyclability is possible even when the amount of crosslinking resin is as high as 40 weight percent based on coating solids. Recycling can be accomplished by dissolving, glycolysis, or direct re-extrusion. Dissolving is depolymerization of polyester resin, e.g., polyethylene terephthalate, to oligomers by reaction with ester exchange monomer (bis-2-hydroxyethyl terephthalate), while glycolysis is depolymerization to ester exchange monomer by reaction with ethylene glycol. Re-extrusion is feeding scrap material directly to the extruder in the polyester film fabrication step. This recycled coating in the scrap material is added in a relatively small amount, about 10% or less of the virgin polyester fed to the extruder. By contrast, current commercial polyester film primed with an acrylic resin cannot be recycled by dissolving or glycolysis because the acrylic component causes gel formation.

Further, some of the copolyester primer coatings of this invention have another advantage in that the ingredients used in formulating those compositions are already approved by the Food and Drug Administration for uses in contact with food, and therefore the coating should not interfere with the use of the polyester film primed with such compositions in food packaging.

This invention is now illustrated by representative examples where all percentages of monomers are given as mole percent; other parts, proportions, and percentages are by weight, unless otherwise indicated.

The base polyester film used in all the examples was PET film sold by E. I. du Pont de Nemours and Company under the trade name Mylar ®. The copolyesters were prepared using standard condensation polymerization techniques. The diacid and diol starting materials are commercial products available from several sources. The melamine-formaldehyde resin was Cymel ®, available from American Cyanamid Company. Ammonia and triethylamine are commercial products available from several sources. Glutaric anhydride was obtained from Aldrich Chemical Company and succinic anhydride was obtained from Baker Chemical Company.

The thickness of primer coating was determined by on-line coating weight determinations. The continuity of primer coating was determined by microscopic examination.

COPOLYMERS

Copolymer 1

| Composition: | 50% ethylene glycol |
| --- | --- |
| | 25.0% azelaic acid |
| | 16.5% terephthalic acid |
| | 8.5% isophthalic acid |
| Inherent viscosity (in methylene chloride): | 0.5 |
| Acid Number: | 0.25 |
| Molecular Weight - number average: | 22,700 |
| - weight average: | 58,800 |

See Emulsions 1, 2

Copolymer 2

Copolymer 1 (300 g) was charged into a 3-necked round bottom flask fitted with an overhead stirrer, nitrogen bleed, reflux condenser, thermometer, and addition port. The flask was heated in refluxing ethylene glycol vapor (198° C.).

When the stirred (50 rpm) copolymer reached the heating medium temperature, 1.83 g of glutaric anhydride was added. After ten minutes, the flask was discharged.

Inherent viscosity: 0.45
Acid Number: 9.3
See Emulsions 3, 15, 23

Copolymer 3

Copolyester adhesive of the following composition:
50% ethylene glycol
19.5% terephthalic acid
16% isophthalic acid
14.5% azelaic acid
Inherent viscosity (in methylene chloride): 0.6
Acid Number: 0.15

To a 37.85 L crystallizer, fitted with an oil heater, overhead stirrer, reflux condenser, nitrogen bleed, and addition port, was added 46 kg of the above copolyester. Over a 4½ hour period, the copolymer temperature was raised to 200° C. To the stirred (60 rpm) copolymer melt was added 0.55 kg of glutaric anhydride. After 18 minutes, the crystallizer was discharged.

| Inherent viscosity | 0.5 |
| --- | --- |
| Acid Number | 10.5 |

See Emulsions 7, 8, 9, 10, 11, 12, 16, 17, 18, 19, 20

Copolymer 4

Copolymer 4 was similar to copolymer 2 except that 3.21 g of succinic anhydride was used in place of glutaric anhydride. Also, the reaction mixture was discharged 18 minutes after the anhydride addition.

| Inherent viscosity (in methylene chloride) | | 0.45 |
| --- | --- | --- |
| Acid number | | 5.1 |
| Molecular weight | - number average | 15,000 |
| | - weight average: | 35,400 |
| See Emulsion 4 | | |

Copolymer 5

Copolymer 5 was prepared as described for copolymer 2, except that the viscosity of copolymer 1 was reduced by addition of 0.6 ml of ethylene glycol. After the glycol was added, the polyester was allowed to equilibrate for 2 hours (at 198° C.) before addition of 3.66 g of glutaric anhydride. The reaction mixture was discharged 18 minutes after the anhydride addition.

Inherent viscosity (in methylene chloride): 0.32
Acid number: 10.7
See Emulsions 13, 14

Copolymer 6

Copolyester of the following composition was prepared:
- 50% ethylene glycol
- 25% isophthalic acid
- 25% azelaic acid Inherent viscosity (in methylene chloride): 0.46
Acid number: 0.2

Using the procedure described for copolymer 5, 300 g of copolymer was first allowed to react with 2 ml of ethylene glycol, then with 3.66 g of succinic anhydride.

Inherent viscosity (in methylene chloride): 0.25
Acid number: 13.1
See Emulsion 21

Copolymer 7

A copolyester of the following composition was prepared.
- 50% ethylene glycol
- 30% isophthalic acid
- 20% azelaic acid Inherent viscosity: 0.4
Acid number: 0.3

This copolyester (300 g) was allowed to react with 0.6 ml of ethylene glycol, then with 3.66 g of glutaric anhydride according to the procedure described for copolymer 6.

Inherent viscosity (in methylene chloride): 0.27
Acid number: 12.7
See Emulsion 22

Copolymer 8

Copolyester adhesive of the following composition:
- 50% ethylene glycol
- 20% terephthalic acid
- 20% isophthalic cid
- 5% azelaic acid
- 5% adipic acid Inherent viscosity (in methylene chloride): 0.43
Acid Number: 1.4
See Emulsion 5

Copolymer 9

A starting copolymer identical in composition to copolymer 8 but with an inherent viscosity (in methylene chloride) of 0.54 and an acid number of 1.2 was partially thermally decomposed by holding the copolymer in a circulating air oven at 150° C. for 24 hours. The resultant product had the following properties:

Inherent viscosity (in methylene chloride): 0.44
Acid Number: 3.4
See Emulsion 6

Copolymer 10

A copolyester (300 g) of the following composition
- 22.5% terephthalic acid
- 17.5% isophthalic acid
- 10% azelaic acid
- 33% neopentyl glycol
- 17% ethylene glycol was allowed to react with 0.6 ml ethylene glycol, followed by reaction with 3.66 g glutaric anhydride according to the procedure described for copolymer 6.

Inherent viscosity (in methylene chloride): 0.36
Acid number: 9.2
See Emulsion 24

EMULSIONS

Emulsion 1 (Comparative)

Copolymer 1 (750 g) was chopped into small pieces and dissolved in 3750 g of methylene chloride by rolling for 16 hours on a mechanical roller. To this solution, 7.5 g of a commercial surfactant, Aerosol®OT (American Cyanamid) was added and dissolved by stirring at room temperature. An aqueous solution of 50 g of another commercial surfactant, Abex®26S (Alcolac, Inc.) in 2250 g of deionized water was prepared separately and was added to the above solution of Copolymer 1 in methylene chloride. The rate of addition was about 200 ml/min, while the mixture was vigorously mixed with an Eppenbach homogenizer controlled by a variable voltage transformer, so that speed could be increased as viscosity increased. After complete addition, the mixture was homogenized for 3 additional minutes. See Coatings 11, 12, 13.

Emulsion 2 (Comparative)

Copolymer 1 (2 g) was dissolved in 50 ml of tetrahydrofuran (THF). The solution was titrated to a phenolphthalein end point with 0.1N aqueous sodium hydroxide. With rapid stirring (magnetic stirring bar at high speed), 75 ml of water was added to the neutralized solution. The rate of water addition was such that the stirred solution remained homogeneous. The polyester precipitated, so that emulsification was unsuccessful.

Emulsion 3

Copolymer 2 (3.6 g) was dissolved in 50 ml of THF. The solution was titrated to a phenolphthalein end point with 0.1N aqueous sodium hydroxide. With rapid stirring, 75 ml of water was added (as in Emulsion 2) to the neutralized solution. A stable bluish-tinged emulsion was obtained. The THF was evaporated out of the stirred emulsion by passing air over the emulsion surface. A bluish-tinged THF-free emulsion was obtained having 5.1% solids. See Coatings 2, 3.

Emulsion 4

Copolymer 4 (7.32 g) was dissolved in 50 ml of THF and neutralized to a phenolphthalein end point with 0.09N sodium hydroxide. With rapid stirring, 75 g of water was added (at a rate to maintain a homogeneous mixture). The THF was evaporated off, leaving a stable aqueous emulsion of 10.1% solids. See Coating 1.

Emulsion 5 (Comparative)

Copolymer 8 (5 g) was dissolved in 30 ml of THF. The solution was titrated to a phenolphthalein end point with 0.1 N aqueous sodium hydroxide. With rapid stirring (magnetic stirring bar at high speed), 70 ml of water was added to the neutralized solution. The rate of water addition was such that the stirred solution remained homogeneous. Copolymer 8 precipitated, so that emulsification was unsuccessful.

Emulsion 6

The procedure of Emulsion 5 was repeated, except that copolymer 9 was used. After the neutralization with sodium hydroxide, addition of water, and subsequent evaporation of THF, a stable bluish white emulsion was obtained (6.4% solids). See Coating 4a.

Emulsion 7

Copolymer 3 (5.1 g) was dissolved in 30 ml of THF, to which was then added 1 ml of triethylamine. Water (100 g) was added with rapid stirring to maintain a homogeneous system. After THF was evaporated, a bluish-tinged emulsion containing 4.9% solids was obtained. See Coating 4.

Emulsion 8 (Comparative)

A 334 g, 20% solids, solution of Copolymer 3 in acetone was prepared. To this solution was added 20 ml of concentrated ammonium hydroxide, which caused the solution to become cloudy. With rapid stirring, 500 g of water was added, resulting in the precipitation of the copolyester.

Emulsion 9 (Comparative)

A 166 g, 20% solids, solution of Copolymer 3 in acetone was prepared, to which was added 10 ml of concentrated ammonium hydroxide and 5.55 g of 30% active commercial surfactant Duponol®WAQE (Du Pont). Two phases formed, which merged on warming to give a hazy solution. Water, 250 g, was added with rapid stirring which precipitated the polyester.

Emulsion 10 (Comparative)

A 334 g, 20% solids, solution of Copolymer 3 in acetone was prepared, to which 20 ml of triethylamine was added, maintaining a clear solution. Water (500 g) was added with rapids stirring, giving a milky emulsion from which the copolyester precipitated during evaporation of the acetone.

Emulsion 11

A 424 g, 25% solids, THF solution of Copolymer 3 was neutralized with 20 ml of triethylamine. To this solution was added 630 g of water with rapid stirring. A bluish-white emulsion was obtained. The THF was evaporated off, leaving a stable, bluish-white copolyester emulsion of 10.95% solids. See Coatings 5, 6.

Emulsion 12

The procedure described for Emulsion 11 was repeated, except that 10 ml of concentrated ammonium hydroxide was used in place of the triethylamine. An aqueous emulsion containing 9.53% solids was obtained. See Coating 6a.

Emulsion 13

Copolymer 5 (5.1 g) was dissolved in 30 g of THF. After 1 ml of triethylamine was added, 90 g of water was added with rapid stirring. A bluish-white emulsion of 7.7% solids was obtained after the THF was evaporated. See Coating 6b.

Emulsion 14 (Comparative)

Copolymer 5 (5 g) was dissolved in 30 g of THF, followed by addition of 90 g of water with rapid stirring. The unneutralized polyester precipitated.

Emulsion 15

Copolymer 2, but with inherent viscosity of 0.39 and acid number of 10, was emulsified using the procedure described for Emulsion 11 but with all quantities scaled-up to give 36 kg of final emulsion. The THF was removed from the emulsion by steam stripping at 16.6 kPa. The final emulsion was bluish-white and had 11.9% solids. See Coatings 7, 16, 17, 18.

Emulsions 16–18 (Comparative)

Copolymer 3 was used to prepare the emulsions in Table I.

A technique similar to that used to make Emulsion 1 was employed, with changes as indicated in Table I. In all cases, 750 g copolymer 3 was used per 3750 g of solvent.

TABLE I

| Solvent Solution | Emulsion 16 | Emulsion 17 | Emulsion 18 |
|---|---|---|---|
| Methylene Chloride | X | — | X |
| Tetrahydrofuran | — | X | — |
| Surfactant, g | | | |
| Diethanolamine | 5 | 5 | 5 |
| Resin ® 90 | 3 | 3 | 3 |
| (disproportionated tall oil rosin, Westvaco Chem. Co.) | | | |
| Water Solution | | | |
| Deionized water, g | 1000 | 1000 | 1000 |
| Abex ® 18S, g | 20 | 20 | 20 |
| (Sodium alkyl aryl ethoxysulfate, Alcolac, Inc.) | | | |
| Mode of Emulsification | PS/WS* | WS/PS** | PS/WS* |
| Solvent Removal by Stripping | | | |
| % Solids | 19.7 | 11.9 | 12.2 |
| pH | 9.2 | 9.3 | — |

*PS/WS = polymer solution added to water solution
**WS/PS = water solution added to polymer solution
Emulsion 16: See Coating 8
Emulsion 17: See Coating 9
Emulsion 18: See Coating 10

Emulsion 19 (Comparative)

Copolymer 3 (5 g) was dissolved in 30 g of dioxane. After 0.5 ml of concentrated ammonium hydroxide was added, 90 g of water was added with rapid stirring. The copolymer precipitated as the water was added.

Emulsion 20 (Comparative)

Copolymer 3 (5 g) was dissolved in a mixture of 5 g of THF and 30 g of dimethoxyethane and then neutralized with 0.5 ml of concentrated ammonium hydroxide. The copolymer precipitated as water was added with rapid stirring.

Emulsion 21

Copolymer 6 (50 g) was dissolved in 200 g of THF. After 3 ml of triethylamine had been added, 300 g of water was added with rapid stirring. A bluish emulsion formed which was steam-stripped to remove the THF. An emulsion containing 10.5% solids was obtained. See Coating 14.

Emulsion 22

The procedure used for Emulsion 21 was followed using Copolymer 7 in place of Copolymer 6. A stable 7.7% emulsion was obtained. See Coating 15.

Emulsion 23

Copolymer 2 (acid number 12.7) was used to make 50 g of 20% solids solutions, containing 25%, 75% or 100% of the solvent indicated in Table II, with the remainder of the solvent being THF. After solution was achieved, 1 ml of triethylamine was added, followed by addition of 70 g of water with rapid stirring.

TABLE II

| Solvent | Emulsifiability % Solvent | | |
|---|---|---|---|
| | 25* | 75* | 100 |
| Methanol | Good | No$^B$ | No$^B$ |
| Acetone | Good | Poor$^A$ | Poor$^A$ |
| Methyl Ethyl Ketone | Good | Good | Poor$^A$ |
| Dioxane | Good | Poor$^A$ | Poor$^A$ |
| Dimethoxyethane | Good | Poor$^A$ | No$^C$ |
| Dimethylformamide | Poor$^A$ | No$^C$ | No$^C$ |

*The balance of the solvent composition was THF.
$^A$Emulsion rapidly settled
$^B$Polyester was not soluble in solvent composition
$^C$Polyester came out of solution upon addition of water Stable emulsions were obtained in most cases using up to 25% cosolvent with tetrahydrofuran. Methyl ethyl ketone is a particularly preferred cosolvent and can be used in amounts of up to 75% with tetrahydrofuran.

Emulsion 24

Copolymer 10 (250 g) was dissolved in 1000 g of THF. After 25 ml of triethylamine had been added, 1600 g of water was added with rapid stirring. The THF was evaporated off, giving a semitransparent 13.6% solids emulsion. See Coating 19.

COATINGS

Coating 1

The following coating bath was prepared:
- 59.4 g Emulsion 4
- 1 g 30% Duponol® WAQE surfactant
- 59.6 g water The bath was kiss coated on polyester film using an off-line coating tower. The dried coating weight was 0.12 g/m² and the coating was continuous. Coating 2

A coating bath consisting of the following was prepared:
- 58.8 g Emulsion 3
- 1.2 g water A drawdown of this coating bath was made on polyester film using a No. 5 wire wound rod. The coating did not wet the film but puddled instead. A continuous film was formed in the puddle areas on drying.

Coating 3

To coating bath 2 was added 0.1 g of 30% Duponol®WAQE. A drawdown was made as in the case of coating 2. A continuous wet coating was obtained, which dried to a continuous copolyester film of coating weight 0.3 g/m²

Coating 4

A coating bath consisting of the following was prepared:
- 90 g Emulsion 7
- 0.32 g 30% Duponol® WAQE surfactant
- 0.1 ml triethylamine
- 0.117 g E535® (50/50 vinylpyrrolidone/vinyl acetate copolymer in ethanol, GAF Corp.)
- 0.032 g Aerosol® OT-75 (75% active sodium salt of dioctyl sulfosuccinate, American Cyanamid)
- 0.6 g isopropyl alcohol
- 0.44 g 10% Aerosil®OX50 dispersion Degussa Inc.)

This coating was kiss coated on polyester film and dried. The coating was continuous with a dry coating weight of 0.12 g/m²

Coating 4a

A coating bath consisting of the following was prepared:
- 62.5 g Emulsion 6
- 0.997 g E535®
- 0.027 g Aerosol®OT-75
- 0.5 g isopropyl alcohol
- 0.67 g 30% Duponol®WAQE surfactant water to make 80 g This bath was kiss coated on polyester film using an off-line coating tower. The dried coating weight was 0.12 g/m² and the coating was continuous.

Coating 5

A coating bath of the following composition was prepared:
- 1370 g Emulsion 11 of 10.95% solids
- 15 g Cymel®301
- 3.63 g E535®
- 1 g Aerosol®OT-75
- 18.6 g isopropyl alcohol
- 0.75 g triethylamine sulfate
- 25 g 30% Duponol®WAQE surfactant
- 45 g 10% Aerosil®OX50
- 10 ml triethylamine
- water to make 2000 g Coating 5 was on-line coated on cast film using a kiss coater and radiation drying. A continuously coated polyester film was obtained. The final dry coating weight was 30 mg/m².

Coating 5 was also off-line kiss coated on polyester film. As with the on-line coated film, a continuous copolyester coating was obtained with a coating weight of 0.12 g/m².

Coating 6

Coating 6 was identical to Coating 5 except that only 50% of the amounts of Cymel®301 and triethylamine sulfate in Coating 5 were used.

Continuous off-line and on-line coatings were obtained using the same procedures as described for Coating 5.

Coating 6a

A coating bath of the following composition was prepared:
- 1574 g Emulsion 12 of 9.53% solids
- 15 g Cymel®301
- 3.63 g E535®
- 1 g Aerosol® OT-75
- 18.6 g isopropyl alcohol
- 0.75 g ammonium sulfate
- 25 g 30% Duponol®WAQE surfactant
- 45 g 10% Aerosil®OX 50
- 10 ml ammonium hydroxide
- water to make 2000 g Coating 6a was off-line kiss coated on polyester film. A continuous copolyester coating was obtained with a coating weight of 0.12 g/m²

Coating 6b

A coating bath of the following composition was prepared:
- 52 g Emulsion 13 of 7.7% solids
- 0.62 gm 30% Duponol®WAQE surfactant
- water to make 80 g Coating 6b was off-line kiss coated on polyester film. A continuous copolyester coating was obtained with a coating weight of 0.12 g/m².

Coating 7

The following coating bath was prepared:
3196 g Emulsion 15
25.3 g Duponol®WAQE
9.2 g E535®
2.5 g Aerosol®OT-75
47 g isopropyl alcohol
38 g Cymel®301
114 g 10% Aerosil OX50 slurry
25 g triethylamine
6.33 g triethylamine sulfate
4094 g water The coating bath was wick-coated on-line and radiation dried to give a continuous coating. The coating weight was 30 mg/m²/side.

Coatings 8–10 (Comparative)

Coatings 8–10 were, respectively, Emulsions 16–18 diluted with water to 5% solids. The coatings were applied to polyester film using a kiss coater. The emulsions gave continuous wet coatings but on drying the coatings were not continuous, forming discrete nodules instead.

Coating 11 (Comparative)

Emulsion 1 was diluted to 5% solids, then off-line coated on polyester film. The wet coating formed a continuous wet film, but on drying the coating solids formed discrete particles.

Coating 12 (Comparative)

The following coating composition was prepared:
651 g Emulsion 1
12.5 g Cymel®301
0.63 g Ammonium sulfate
3 g E535®
0.83 g Aerosol®OT-75
15.5 g isopropyl alcohol
37.5 g 10% Aerosil®OX50 slurry This composition was kiss coated on polyester film and dried. Microscopic examination showed the coating was discontinuous. The coating weight was 0.12 g/m².

Coating 13 (Comparative)

The same coating as described in coating 12 was on-line wick coated. While the wet coating formed a continuous film, the dry coating was discontinuous and consisted of discrete nodules. The average coating weight was 30 mg/m².

Coating 14

The following coating bath was prepared:
76.2 g Emulsion 21
0.8 g Cymel®301
0.04 g triethylamine sulfate
0.19 g E535®
0.05 g Aerosol®OT-75
1 g isopropyl alcohol
0.52 g Duponol®WAQE
1 ml triethylamine
2.4 g 10% Aerosil®OX50 slurry
water to 160 g The coating was off-line kiss coated and dried on polyester film. The coating was continuous. having a coating weight of 0.12 gm/m².

Coating 15

Coating 15 was similar to Coating 14 except that 103.9 g of Emulsion 22 was used. The dried coating was continuous when coated off-line on polyester film (coating weight 0.12 g/m²).

Coating 16

A coating bath consisting of the following was prepared:
84.0 g Emulsion 15
0.2 ml triethylamine
0.36 g E535®
0.1 g Aerosol®OT-75
1.86 g isopropyl alcohol
2.5 g 30% Duponol®WAQE surfactant
water to make 200 g.

Coating 17

Same as Coating 16, plus:
0.1 g Cymel®301
0.005 g ammonium sulfate

Coating 18

Same as Coating 16, plus:
0.5 g Cymel®301
0.025 g ammonium sulfate

Each of Coatings 16–18 were off-line kiss coated on 48 gage polyester film at dry coating weights of 0.12 g/m², 0.24 g/m², 0.48 g/m², 0.96 g/m² and 1.92 g/m². A piece of each coated sample, which was initially dried at 150 C, was further cured at 200° C. for one minute under restraint.

Coating 19

Coating 19 was similar to Coating 5 except that 1103 g of Emulsion 24 was used in place of Emulsion 11.

Coating 19 was on-line coated on uniaxially stretched film using a kiss coater and dried. The film was subsequently biaxially oriented and heat set at 200° C. A continuously coated polyester film was obtained. The final coating weight was 40 mg/m².

ADHESION

Solvent Based Top Coat's Adhesion

Polyester film samples primed with various coatings (both on-line and off-line) and finished with various top coatings were tested for adhesion. Drawdowns of the top coat were made using a wire wound rod (No. 7). After the coating dried for 16 hours at room temperature, the top coats were crosshatched. The crosshatched area was covered with a strip of No. 600 tape (3M), and the tape was pressed firmly down. One-half hour later, the tape was ripped off. The results are reported in Table III as amount of coating (percent) in the crosshatched area removed by the tape.

TABLE III

| Sample | CAP | CAB | Saran® | Vinyl Ink | Polyester Ink |
|---|---|---|---|---|---|
| Unprimed (comparative) | 100 | 100 | 100 | 100 | 0 |
| Coating 5 (on-line) | 0 | 0 | 0 | 0 | 0 |
| Coating 5 (off-line) | 0 | 0 | 10 | — | — |
| Coating 6 (on-line) | 20 | 0 | 0 | — | — |

TABLE III-continued

| Sample | CAP | CAB | Saran ® | Vinyl Ink | Polyester Ink |
|---|---|---|---|---|---|
| Coating 6 (off-line) | 10 | 10 | 10 | — | — |
| Coating 7 (on-line) | 0 | 0 | 0 | — | — |
| Coating 12 (comparative) | 100 | — | 100 | — | — |
| Coating 13 (comparative) | 100 | 80 | — | — | — |
| Coating 14 (off-line) | 0 | 0 | 0 | — | — |
| Coating 15 (off-line) | 0 | 0 | 0 | — | — |

| | |
|---|---|
| CAP Coating | 7.5 g Cellulose Acetate Propionate CAP 482-0.5 ® (Eastman Chemical Products, Inc.) 26.4 g ethanol 14.5 g toluene 23.3 g methylene chloride 17.7 g acetone |
| CAB Coating | 45 g Cellulose Acetate Butyrate CAB 381-2 ® (Eastman Chemical Products, Inc.) 23 g acetone 23 g ethanol 54 g toluene |
| Saran ® Coating | 20 g Dow Saran ® F310 (polyvinylidene chloride) 40 g THF 40 g methyl ethyl ketone |
| Vinyl Ink | commercial product (Naz-Dar Company, Chicago, IL) Naz Dar 44-105 |
| Polyester Ink | commercial product (General Formulation, Sparta, MI) General Formulation 140-1139 |

Evaporatively Deposited Metal Top Coat's Adhesion

Polyester film samples were vacuum metalized with aluminum using a Varian 3118 vacuum coater system (Varian Associates, Palo Alto, CA). The aluminum layer was 0.07 μm thick. Adhesion of the metal to the base film was determined by laminating the adhesive side of Mylar ®50 OL film (E. I. du Pont de Nemours and Company, Wilmington, DE) to the metal layer. The lamination was done on a Model 276 LM General Binding Corporation (Northbrush, IL) laminator at 145° C. The laminated samples were aged for 48 hours at ambient conditions before testing adhesion.

The adhesion was tested by running 180° peel strengths using a Sutter Peel Test (Alfred Suter Company, New York, NY) on 2.54 cm wide samples at a peel rate of 30.5 cm/min.

| Sample | Peel Strength (g/cm) |
|---|---|
| Unprimed (comparative) | 165 |
| Coating 5 (on-line) | 190 |
| Coating 19 (on-line) | 300 |

The unprimed sample failed in the aluminum-polyester interface. The sample primed with Coating 5 failed in both the aluminum-prime coat and aluminum/Mylar ® film interface while the sample primed with coating 19 failed only in the aluminum, Mylar ® film interface.

HEAT SEAL

Using a Robot Heat Sealer (Pack Rite Machine, Franksville, WI) with nip pressure of 138 kPa, jaw temperature of 100° C., and dwell time of 5 sec, each of Coatings 16–18 in Table IV was heat-sealed to itself, coated side to coated side. The heat-sealed samples were aged for 2 days. The peel strengths, determined as 90° peels on 2.54 cm wide samples at a peel rate of 30.5 cm/min, are reported in Table IV.

TABLE IV

| | Peel Strengths (g/cm × 2.54) | | | | | | | | | |
|---|---|---|---|---|---|---|---|---|---|---|
| | 160° C. Cure | | | | | 200° C. Cure | | | | |
| Coating Weights (g/m$^2$): | 0.12 | 0.24 | 0.48 | 0.96 | 1.92 | 0.12 | 0.24 | 0.48 | 0.96 | 1.92 |
| Coating 16 | 0 | 22 | 102 | 153 | 168 | 3 | 32 | 50 | 105 | 57 |
| 17 | 0 | 18 | 68 | 88 | 168 | 7 | 47 | 163 | 112 | 277 |
| 18 | 0 | 0 | 47 | 123 | 135 | 25 | 20 | 67 | 183 | 180 |

As can be seen from Table IV, these coatings can convey heat-sealing properties especially at coating weights of about 1 g/m$^2$ and higher. The heat-sealability of the coatings can be controlled by both the concentration of crosslinking agent and the curing temperature.

Explanation of Examples

Adhesion a. Adhesion tests of Coating 5 and Coating 6 show the invention's utility whether the coating is applied on-line as part of the polyester film manufacturing process or off-line. These examples also show that a range of cure agent concentrations may be used (Table III).
b. Coatings 5, 6, 7, 14 and 15 show that a variety of carboxylated copolyester compositions may be used in the invention.
c. Coatings 5, 6, 7, 14 and 15 when compared to Coatings 12 and 13 show that a continuous prime coat is needed for broad adhesion enhancement (Table III).
d. Coatings 5, 6, 7, 14 and 15 when compared to unprimed film show the adhesion enhancement offered by continuous copolyester prime coats of the invention.
e. Coatings 5 and 19 compared to unprimed film show that a copolyester primer coat enhances adhesion of evaporatively deposited metal.

Coatings a. Coating 2 when compared to Coating 3 shows that while the copolyester emulsion made by the invention is film-forming, wetting aids are required to form continuous wet coatings on polyester film.
b. Coatings 1, 3, 4a, 4, 5, 6, 6a, 6b, 7, 14 and 15 show the variety of carboxylated copolyesters which give continuous coatings using this invention.
c. Coatings 8–13 when compared to Coatings 5, 6, 7, 14 and 15 show that emulsions made by traditional high shear techniques are not film-forming despite forming continuous wet films.
d. Coatings 16–18 are examples of compositions that can impart various levels of heat sealability to polyester film (Table IV).

Emulsions a. Emulsions 1, 16, 17 and 18 show that stable emulsions which form continuous wet coatings can be made by traditional high shear techniques.
b. Emulsions 2 and 5 show that the copolyester must be carboxyl terminated.
c. Emulsions made with NaOH (3, 4, 6, triethylamine 7,11,13,15,21,22) and NH₄OH (12) shows that a variety of monovalent bases may be used.
d. Emulsion 14 when compared to the emulsions in c. show that neutralization is required to obtain a stable emulsion.
e. Emulsions 8, 9, 10, 19 and 20 show that certain other water-miscible solvents in which the carboxylated copolyester is soluble do not give stable emulsions.
f. Emulsions listed under 23 show that certain water-miscible cosolvents can be used in conjunction with THF, the operable level of the cosolvent being different for each cosolvent, but in all cases the presence of THF is required.

RECYCLE

On-line coated film (Coating 7) was tested for recyclability through dissolving. Coated PET flake was dissolved in ethylene glycol monomer at 230° C., the PET flake accounting for 90% of the total terephthalyl groups. The dissolved flake was filtered and repolymerized. The repolymerized material was dissolved in solvent and filtered. No difference was seen between using coated flake and uncoated flake, neither showing any filtration or gel problems. This example shows that coated polyester-flake can be recycled and reused and can be handled as conveniently as uncoated flake.

I claim:

1. An article which is a crystalline polyester film or sheet coated with a carboxylated copolyester primer composition consisting essentially of a copolymer of a mixture of dicarboxylic acids, the total amount of the acid components being 50 mole percent, with at least one diol, the total amount of diol component being 50 mole percent, the copolymer being further modified by esterifying the terminal hydroxyl groups by treatment with an anhydride of a dicarboxylic acid, or by pyrolysis of the copolyester, thus providing terminal carboxyl groups, the acid number of the carboxylated copolyester being about 3-20;

said carboxylated copolyester composition further being optionally crosslinked by means of a melamine-formaldehyde, urea-formaldehyde, benzoguanamine-formaldehyde, glycoluril-formaldehyde, epoxy, or aziridine resin.

2. An article of claim 1, wherein the acid number of the carboxylated copolyester is 4–12.

3. An article of claim 2, wherein the carboxylated copolyester is a copolyester of about 0–40 mole % of isophthalic acid, 0–30 mole % of terephthalic acid, 0–40 mole % of azelaic acid, and 0–40 mole % of adipic acid with 0–50 mole % of ethylene glycol, 0–40 mole % of neopentyl glycol, and 0–20 mole % of diethylene glycol.

4. An article of claim 3 wherein the carboxylated copolyester is a copolyester having a composition selected from the group consisting of:

| | | |
|---|---|---|
| A. | 22.5 | mole % of terephthalic acid |
| | 17.5 | mole % isophthalic acid |
| | 10 | mole % azelaic acid |
| | 33 | mole % neopentyl glycol |
| | 17 | mole % ethylene glycol |
| B. | 20 | mole % terephthalic acid |
| | 20 | mole % isophthalic acid |
| | 5 | mole % adipic acid |
| | 5 | mole % azelaic acid |
| | 50 | mole % ethylene glycol |
| C. | 16.5 | mole % terephthalic acid |
| | 8.5 | mole % isophthalic acid |
| | 25 | mole % azelaic acid |
| | 50 | mole % ethylene glycol |
| D. | 25 | mole % terephthalic acid |
| | 10 | mole % isophthalic acid |
| | 15 | mole % azelaic acid |
| | 50 | mole % ethylene glycol |
| and | | |
| E. | 25 | mole % isophthalic acid |
| | 25 | mole % azelaic acid |
| | 50 | mole % ethylene glycol |

5. An aqueous, film-forming coating emulsion of a carboxylated copolyester composition consisting essentially of a copolymer of a mixture of dicarboxylic acids, the total amount of the acid components being 50 mole percent, with at least one diol, the total amount of diol component being 50 mole percent, the copolymer being further modified by esterifying the terminal hydroxyl groups by treatment with an anhydride of a dicarboxylic acid, or by pyrolysis of the copolyester, thus providing terminal carboxyl groups, the acid number of the carboxylated copolyester being about 3–20;

said carboxylated copolyester composition further being optionally crosslinked by means of a melamine-formaldehyde, urea-formaldehyde, benzoguanamine-formaldehyde, glycoluril-formaldehyde, epoxy, or aziridine resin.

6. An emulsion of claim 5 wherein the acid number of the carboxylated copolyester is 4–12.

7. An emulsion of claim 6 wherein the carboxylated copolyester is a copolyester of about 0–40 mole % of isophthalic acid, 0–30 mole % of terephthalic acid, 0–4-mole % of azelaic acid, and 0–40 mole % of adipic acid with 0–50 mole % of ethylene glycol, 0–40 mole % of neopentyl glycol, and 0–20 mole % of diethylene glycol.

8. An emulsion of claim 7 wherein the carboxylated copolyester is a copolyester of a composition selected from the group consisting of:

| | | |
|---|---|---|
| A. | 22.5 | mole % of terephthalic acid |
| | 17.5 | mole % isophthalic acid |
| | 10 | mole % azelaic acid |
| | 33 | mole % neopentyl glycol |
| | 17 | mole % ethylene glycol |
| B. | 20 | mole % terephthalic acid |
| | 20 | mole % isophthalic acid |
| | 5 | mole % adipic acid |
| | 5 | mole % azelaic acid |
| | 50 | mole % ethylene glycol |
| C. | 16.5 | mole % terephthalic acid |
| | 8.5 | mole % isophthalic acid |
| | 25 | mole % azelaic acid |
| | 50 | mole % ethylene glycol |
| D. | 25 | mole % terephthalic acid |
| | 10 | mole % isophthalic acid |
| | 15 | mole % azelaic acid |
| | 50 | mole % ethylene glycol |
| and | | |
| E. | 25 | mole % isophthalic acid |
| | 25 | mole % azelaic acid |
| | 50 | mole % ethylene glycol |

9. A process for preparing an aqueous, film-forming coating emulsion of a carboxylated copolyester composition consisting essentially of a copolymer of a mixture of dicarboxylic acids, the total amount of the acid components being 50 mole percent, with at least one diol, the total amount of diol component being 50 mole percent, the copolymer being further modified by esterifying the terminal hydroxyl groups by treatment with an anhydride of a dicarboxylic acid, or by pyrolysis of the copolyester, thus providing terminal carboxyl groups, the acid number of the carboxylated copolyester being about 3–20;

said process comprising the following sequential steps:
 (a) dissolving the carboxylated copolyester in an organic solvent selected from the group consisting of tetrahydrofuran and mixtures of tetrahydrofuran with at least one other organic cosolvent selected from the group consisting of methanol, acetone, dioxane, dimethoxyethane, and methyl ethyl ketone, the amount of a cosolvent other than methyl ethyl ketone or total amount of such cosolvents being at most about 25 weight % of the solvent mixture, and the amount of methyl ethyl ketone being at most about 75 weight % of the solvent mixture, the balance in each case being tetrahydrofuran;
 (b) neutralizing the carboxylic groups with an inorganic base, ammonia, or an organic amine;
 (c) adding a sufficient amount of water with good agitation to cause emulsification; and
 (d) evaporating the organic solvent.

10. The process of claim 9 wherein a surfactant is added to the emulsion following the evaporation of organic solvent.

11. The process of claim 10 wherein the surfactant is selected from the group consisting of sodium lauryl sulfate, sodium salt of dioctyl sulfosuccinate, nonylphenol polyethylene glycol ethers, and ammonium lauryl ether sulfates.

12. The process of claim 9 wherein the carboxylated copolyester has an acid number of 4–12.

13. The process of claim 12 wherein the organic solvent is a mixture of about 75 weight percent of methyl ethyl ketone and 25 weight percent of tetrahydrofuran.

14. The process of claim 12 wherein the neutralization step b) is carried out with an organic tertiary amine.

15. The process of claim 12 wherein the carboxylated copolyester is a copolyester having a composition selected from the group consisting of:

| | | |
|---|---|---|
| A. | 22.5 | mole % of terephthalic acid |
| | 17.5 | mole % isophthalic acid |
| | 10 | mole % azelaic acid |
| | 33 | mole % neopentyl glycol |
| | 17 | mole % ethylene glycol |
| B. | 20 | mole % terephthalic acid |
| | 20 | mole % isophthalic acid |
| | 5 | mole % adipic acid |
| | 5 | mole % azelaic acid |
| | 50 | mole % ethylene glycol |
| C. | 16.5 | mole % terephthalic acid |
| | 8.5 | mole % isophthalic acid |
| | 25 | mole % azelaic acid |
| | 50 | mole % ethylene glycol |
| D. | 25 | mole % terephthalic acid |
| | 10 | mole % isophthalic acid |
| | 15 | mole % azelaic acid |
| | 50 | mole % ethylene glycol |
| and | | |
| E. | 25 | mole % isophthalic acid |
| | 25 | mole % azelaic acid |
| | 50 | mole % ethylene glycol |

16. A process for preparing a crosslinkable coating composition, said process consisting in adding to an emulsion made according to claim 15 a crosslinking agent selected from the group consisting of melamine-formaldehyde, urea-formaldehyde, benzoguanamine-formaldehyde, glycoluril-formaldehyde, epoxy, and aziridine resins, the amount of said resin being up to about 40 weight percent, based on the weight of the carboxylated copolyester.

17. A method of priming a crystalline polyester film or sheet, said method comprising applying to at least one face of said film or sheet a coating emulsion of a carboxylated copolyester composition consisting essentially of a copolymer of a mixture of dicarboxylic acids, the total amount of the acid components being 50 mole percent, with at least one diol, the total amount of diol component being 50 mole percent, the copolymer being further modified by esterifying the terminal hydroxyl groups by treatment with an anhydride of a dicarboxylic acid, or by thermal decomposition of the copolyester, thus providing terminal carboxyl groups, the acid number of the carboxylated copolyester being about 3–20; and drying the coating.

18. A method of claim 17 wherein the acid number of the carboxylated copolyester is 4–12.

19. The method of claim 18, wherein said carboxylated copolyester composition comprises an agent selected from the group consisting of melamine-formaldehyde, urea-formaldehyde, benzoguanamine-formaldehyde, glycoluril-formaldehyde, epoxy, and aziridine resins, the amount of said resin being up to about 40 weight percent based on the carboxylated copolyester;

the coated film or sheet being heated, after drying, to a sufficient temperature to cause crosslinking.

20. The method of claim 17 wherein the film or sheet is stretched prior to coating and drying.

21. The method of claim 17 wherein the film or sheet is stretched following coating and drying.

22. The method of claim 21 wherein the thickness of the coating after stretching and drying is about 0.01 to 0.10 μm.

23. The method of claim 17 wherein the thickness of the primer composition prior to drying is about 0.05–15 μm.

* * * * *